F. C. HODGMAN.
MACHINE FOR MARKING AND COATING BOBBINS.
APPLICATION FILED JULY 7, 1908.
920,870.
Patented May 4, 1909.
7 SHEETS—SHEET 1.
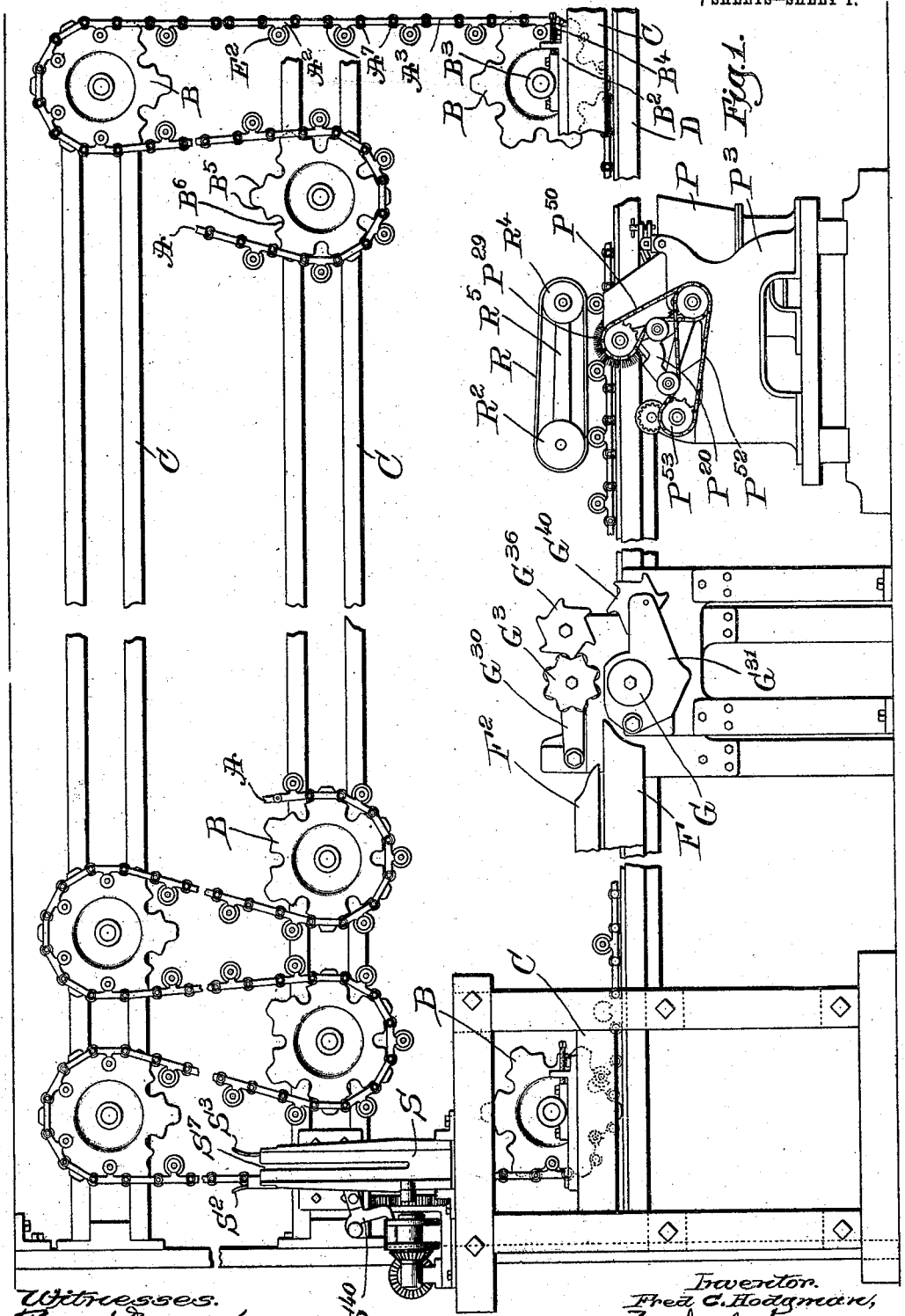

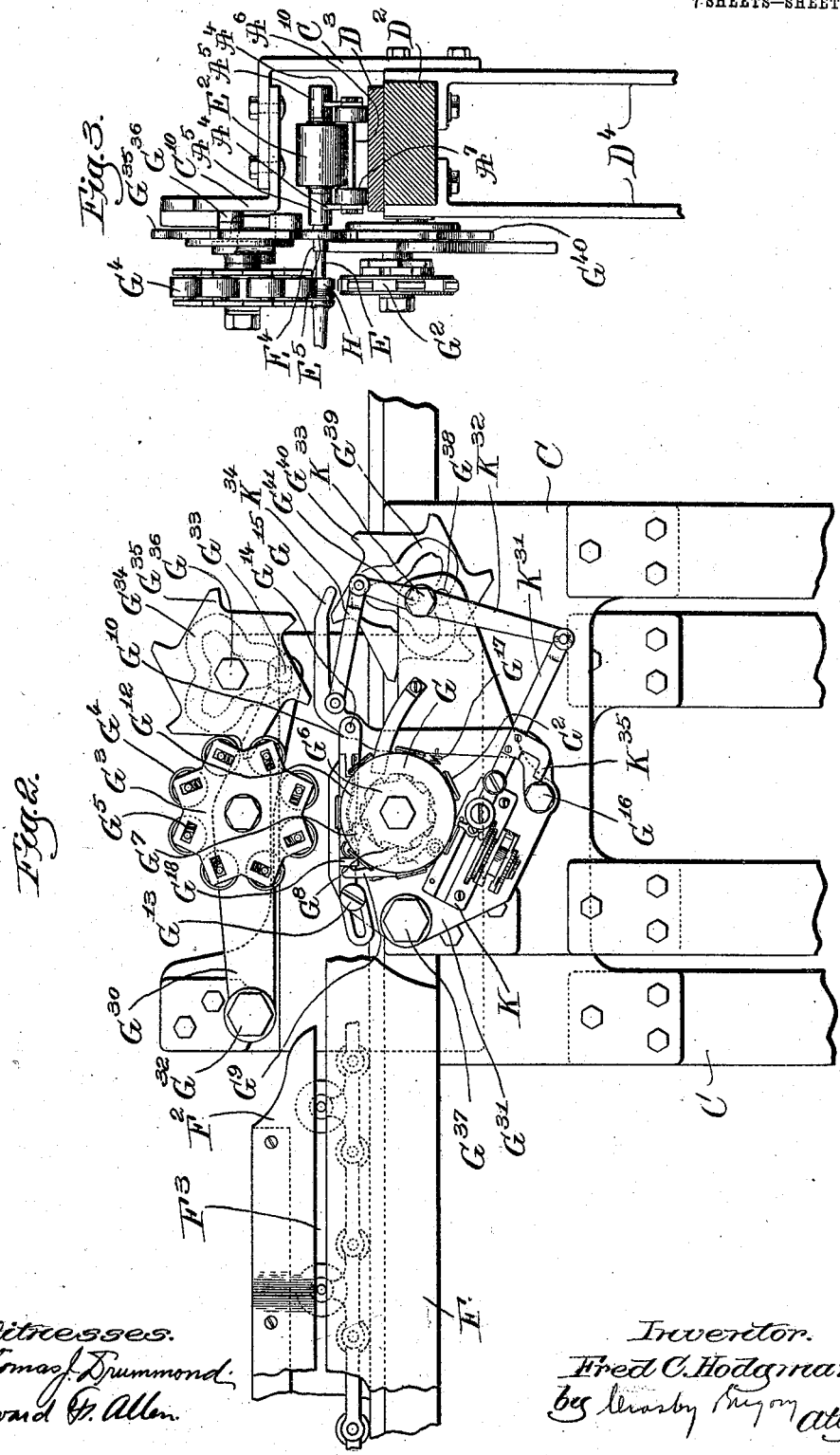

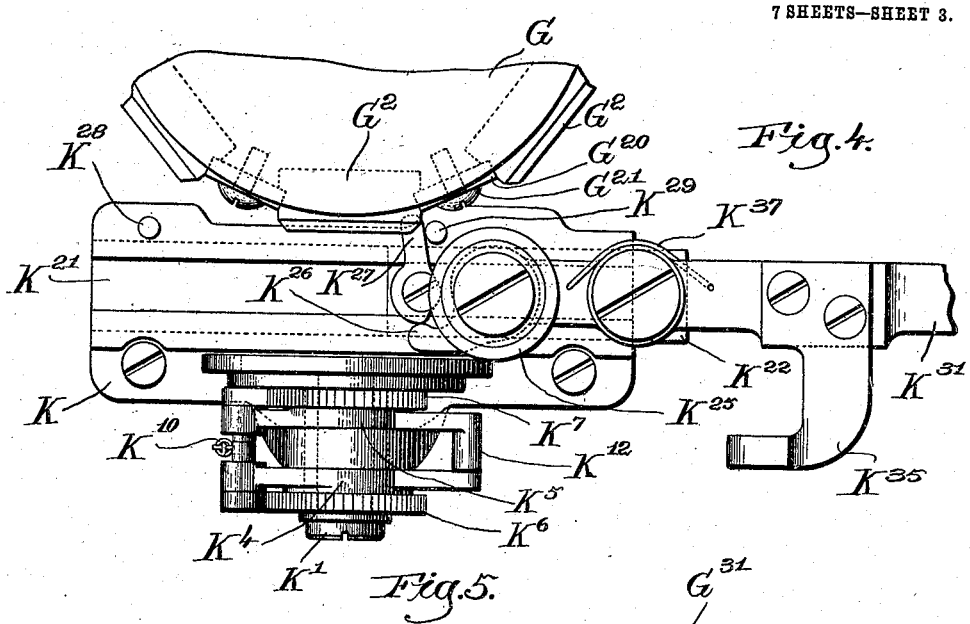
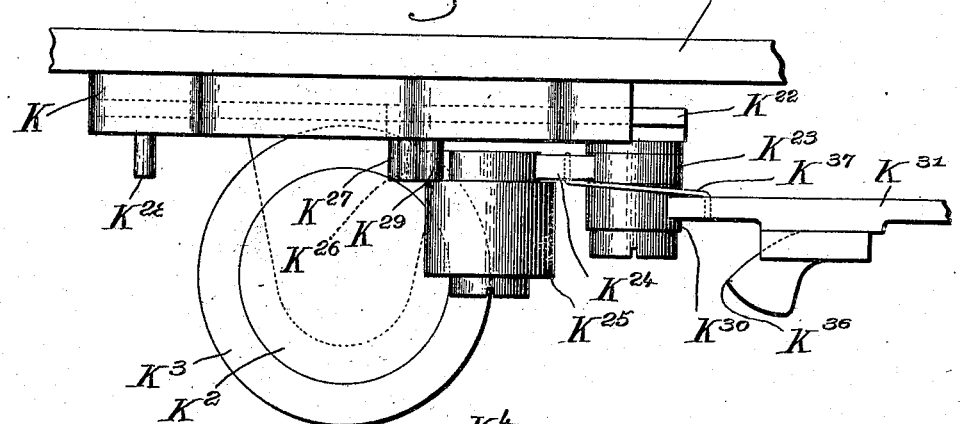
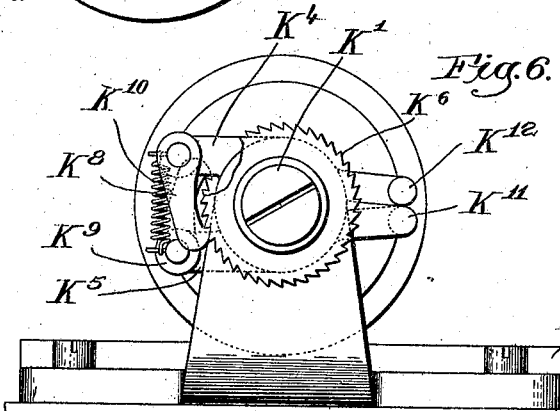

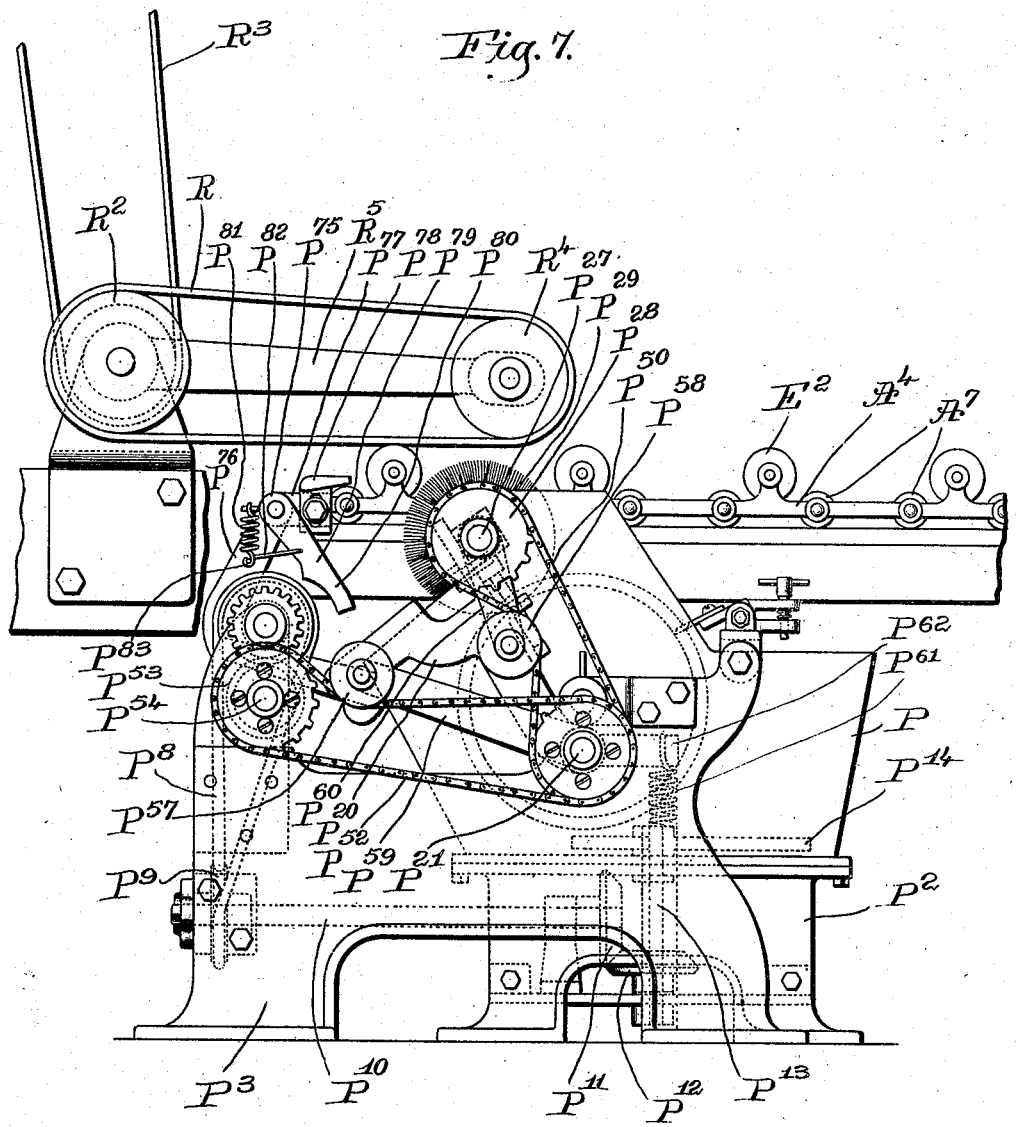

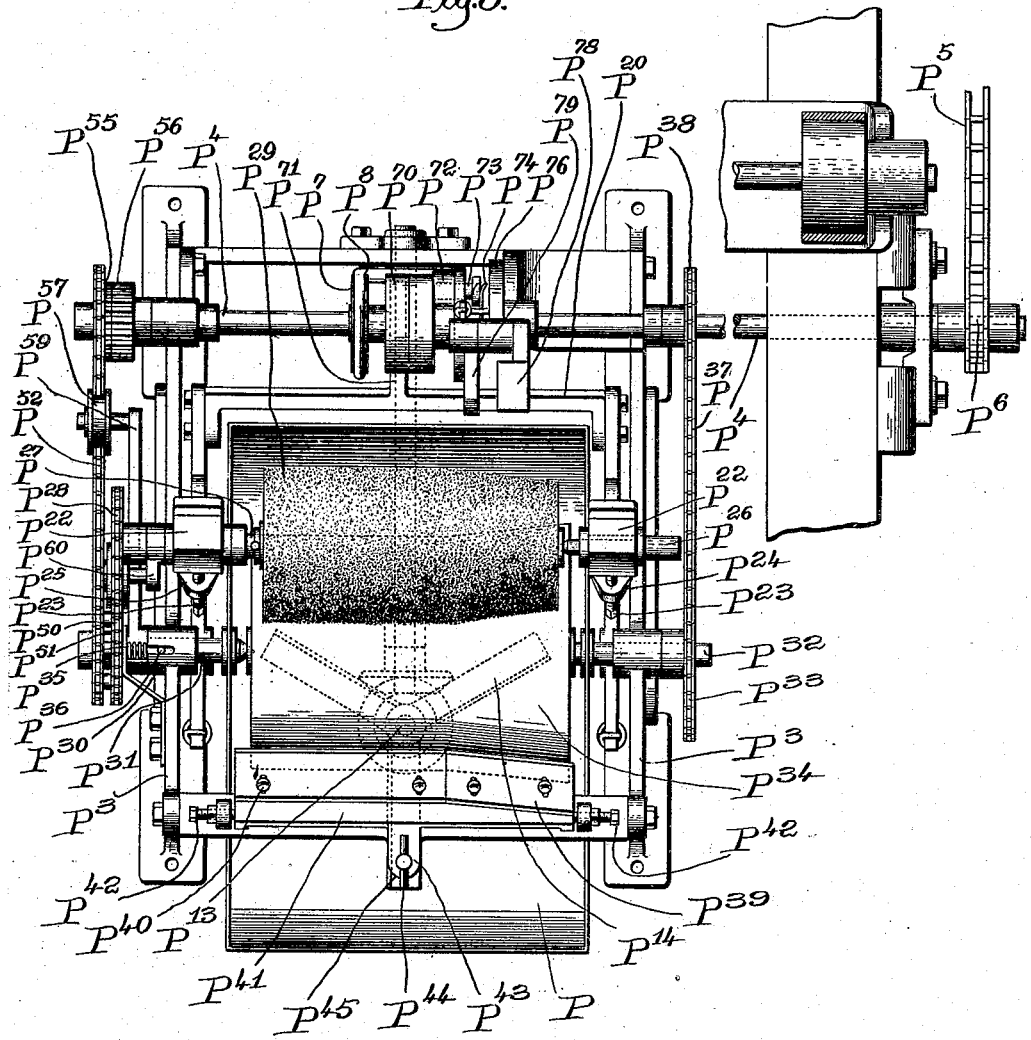

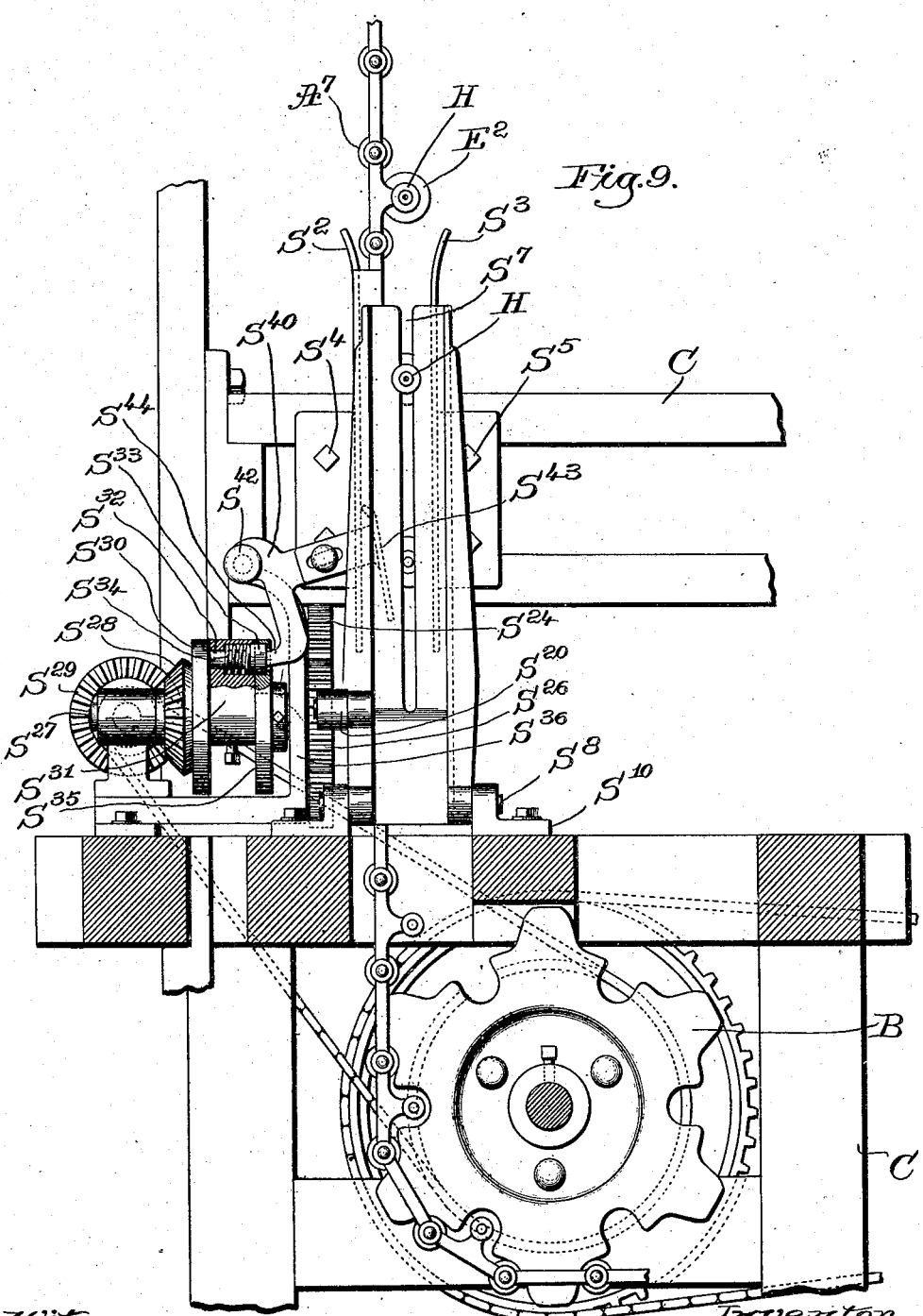

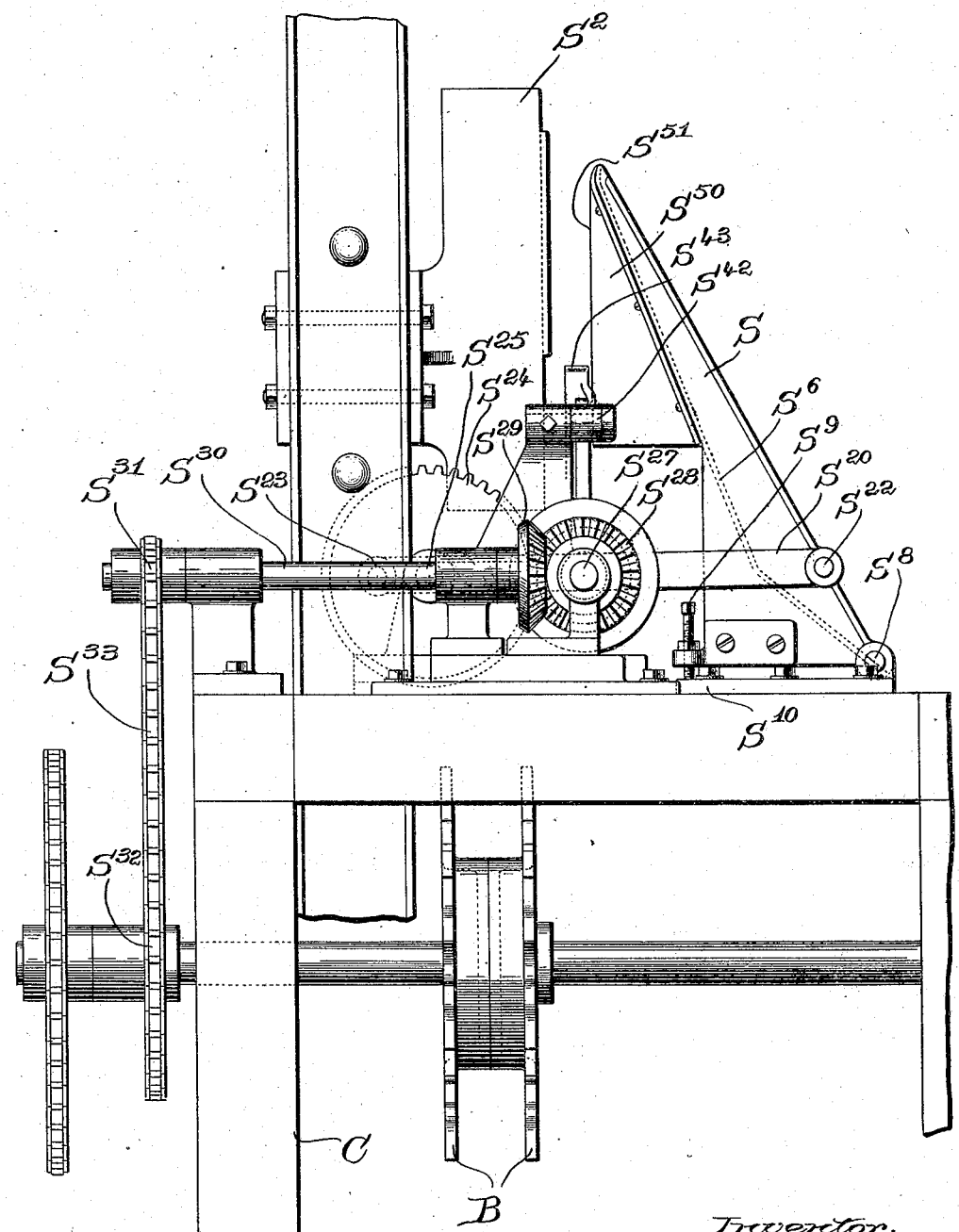

UNITED STATES PATENT OFFICE.

FRED C. HODGMAN, OF HOPEDALE, MASSACHUSETTS, ASSIGNOR TO DRAPER COMPANY, OF HOPEDALE, MASSACHUSETTS, A CORPORATION OF MAINE.

MACHINE FOR MARKING AND COATING BOBBINS.

No. 920,870.

Specification of Letters Patent.

Patented May 4, 1909.

Application filed July 7, 1908. Serial No. 442,279.

*To all whom it may concern:*

Be it known that I, FRED C. HODGMAN, a citizen of the United States, and a resident of Hopedale, in the county of Worcester and State of Massachusetts, have invented an Improvement in Machines for Marking and Coating Bobbins, of which the following description, in connection with the accompanying drawing, is a specification, like letters on the drawing representing like parts.

This invention has for its object the production of a machine for automatically placing a mark or marks upon bobbins, and subsequently applying thereto a coating of protecting or preserving material. It is generally desirable and necessary to print or otherwise mark upon the butt of the bobbin some identifying mark, and it is also the general practice to coat the bobbins with varnish, shellac or similar material to give a smooth, hard surface thereto and to preserve the wood from the affects of moisture.

In the present invention provisions are made for marking or printing the bobbins automatically, and then automatically applying thereto one or two coats, as desired, of the coating material, and also after the application of each coat supporting the bobbin free from contact with other objects for a period of time sufficiently long to insure the thorough drying of the coating material, and also for ejecting the bobbins from the apparatus after they have been marked and coated with one or two coats, as desired, and the said coat or coats have become thoroughly dried.

In the operation of the machine all that is required of the operator is to place the bobbins on the spindles of the carrier, and if two coats are desired to place in addition a striker upon one of the spindles. The automatic action of the machine takes care of the rest of the work.

The invention will more fully appear from the accompanying description and drawings and will be particularly pointed out in the claims.

The drawings show the preferred form of the machine, but it is obvious that the invention may be embodied in other structures, and the invention is not to be restricted in its scope other than as is required by the claims.

Figure 1 is a side elevation showing the entire apparatus with parts thereof broken away. Fig. 2 is a side elevation of the printing mechanism. Fig. 3 is an end elevation of the printing mechanism with the trackway in cross-section. Fig. 4 is a side elevation enlarged of a portion of the printing mechanism showing the inking device. Fig. 5 is a top plan view of the parts shown in Fig. 4 with the exception of the printing cylinder. Fig. 6 is a bottom plan view of a portion of the parts shown in Fig. 4. Fig. 7 is a side elevation of the coating mechanism. Fig. 8 is a top plan view of the coating mechanism. Fig. 9 is a side elevation enlarged of the ejector mechanism. Fig. 10 is an end elevation of the portion of the machine shown in Fig. 9.

The machine comprises an endless flexible carrier A, herein shown as made up of a series of members $A^2$, $A^3$, pivoted together. The carrier is supported and directed in its movement by a plurality of idler rolls B, mounted in a suitable framework C. The length of the carrier and the number and arrangement of the idler rolls will depend upon the conditions under which the machine is used, but the idler rolls are arranged first so as to direct the path of the endless carrier past the printing, coating and ejector mechanisms, and second so as to give a long and preferably sinuous course to the carrier after it has passed the coating mechanism. In the drawings the framework C is shown broken away. It may be of any desired length and height, and by arranging the idler rolls in staggered relation, as shown in the drawings, the space required to secure a sufficiently long carrier may be minimized.

A preferably horizontally arranged trackway D supports the carrier and the bobbins carried thereby in proper position during the passage past the printing and coating mechanisms, and this trackway is shown as made up of a wooden beam $D^2$ and a superimposed metal strip or track $D^3$, the trackway being supported by suitable standards $D^4$ (Fig. 3).

Some of the idler rolls B are made adjustable on the supporting frame so as to provide for taking up any slack in the carrier, and particularly for maintaining the carrier straight and firm as it passes the printing and coating mechanisms. The drawings indicate the two idler rolls which direct the carrier to and from the trackway D as being thus made adjustable. For that purpose the framework C is shown as provided with a bearing block $B^1$, $B^2$, upon which the bearing $B^3$ is adjusted by means of the threaded setscrew $B^4$.

The members of the endless carrier, as herein shown, consist of the spindle supporting members $A^2$ and the link members $A^3$. These members are pivoted together and each pivot joint is provided with rolls adapted to run over the trackway D as the carrier passes therealong, and also adapted to contact with the idler rolls and reduce the friction of the chain in passing around the said idler rolls. In order to secure a firm and accurate bobbin support the endless carrier is shown as made up of parallel separated sections. The carrier is, therefore, shown as constructed as follows. Links $A^4$ are provided with upwardly projecting portions formed into bearings $A^5$, in which bearings is journaled the bobbin-supporting spindle E. On the spindle E between the bearings $A^5$ is fixedly mounted a driving roll $E^2$, by means of which the spindle may be rotated. The links $A^4$ connect with the straight links of the members $A^3$. Each joint where one set of links joins on to another is formed by a shaft $A^6$, and on the shaft are mounted near each end the rolls $A^7$.

Each idler roll B is notched, as illustrated, on its periphery to coöperate with the rolls $A^7$ when the carrier is running with one side against the idler roll, and to coöperate with both the bearings $A^5$ and the rolls $A^7$ when the carrier is running with its opposite side against the idler roll, the notches $B^5$ coöperating with the rolls $A^7$, and the notches $B^6$ with the bearings $A^5$. It will thus be seen that the spindles E, which constitute the bobbin holders project laterally from the carrier and out beyond the trackway C as the carrier moves thereover. As the carrier moves along an operative standing in advance of the printing mechanism slips the bobbins to be marked and coated on to the spindles in succession as they come along.

The first operation performed by the machine is to aline the bobbins so as to assure the mark placed on the butts or other suitable portion thereof by printing mechanism being placed in the same position on each bobbin. The alining device consists of the guide-bar F, fastened to the face of the guideway D and projecting upwardly, and a second guide-bar $F^2$ supported from the opposite side of the guideway and overhanging. The two guide-bars F and $F^2$ are separated by a narrow slot $F^3$ in line with the projecting spindles E and of sufficient width that the spindles may pass through the slot readily. The face of the guide-bars F and $F^2$ is curved so that the portion nearest the marking mechanism will present the butts of the bobbins in the proper position. The bobbins are placed on at the rear end of the guide-bars with their ends against the guide-bars, and as they are carried along they are moved out by the guide-bars into the proper position.

The second operation performed by the machine is to place the desired mark upon the butt or other suitable portion of the bobbin. This marking mechanism is herein shown as a device for printing or stamping the bobbin with an inked die. The mechanism is shown in detail in Figs. 2 and 6, of the drawing, and is supported in suitable manner by the framework C. It comprises in the form herein shown a rotary die member G provided at suitable intervals with projecting dies $G^2$, bearing the mark to be impressed upon the bobbin. These dies are shown as held in place by bridge pieces $G^{20}$, taking into notches in the peripheries of the dies $G^2$ and held in place by screws $G^{21}$, (Fig. 4). It also comprises a rotary platen member $G^3$, provided with rolls $G^4$, spring-pressed outwardly in the slots $G^5$. The axes of the members G and $G^3$ are vertically alined, and the distance between the members is such that when the bobbin butt H, for example, which is to be marked, comes along the bobbin will be pressed against the die $G^2$ and roll along thereover by reason of its contact therewith and with the spring-pressed rolls $G^4$, the mark on the die being thus applied to the bobbin butt.

The dies $G^2$ may bear the same mark and thus all the bobbins may be marked alike or they may bear different marks. Each die is brought into position and retained there during the marking operation by the following means. The member G has attached thereto to rotate therewith the circular ratchet $G^6$, coöperating with the pawl $G^7$, and also the oppositely arranged ratchet $G^8$, coöperating with the detent pawl $G^9$. The pawl $G^7$ is pivoted on the bar $G^{10}$, and held in contact with the ratchet $G^6$ by means of the spring $G^{12}$. The bar $G^{10}$ is slotted at its rear end to slide on the pin $G^{13}$, and is pivoted at its forward end at $G^{14}$ to the curved lever $G^{15}$, having its fulcrum at $G^{16}$. The lever $G^{15}$ is normally drawn toward the member G by the spring $G^{17}$. The detent pawl $G^9$ contacts at its upper end with the projection $G^{18}$ on the slide-bar $G^{10}$. The end of the lever $G^{15}$ projects into the path of the bobbin supported on the carrier. Hence as a bobbin comes along it strikes the lever $G^{15}$ drawing forward the slide-bar $G^{10}$, and causing the pawl $G^7$ to rotate the member G until the next die $G^2$ comes in position when the detent pawl $G^9$ catches in the ratchet $G^8$ and retains the member G in proper position. Upon the passing of the detent over the end of the lever $G^{15}$ the parts return under the influence of the spring $G^{17}$ to the position illustrated, freeing the detent pawl $G^9$ from the ratchet $G^8$ ready for the next operation.

It is usually desirable to ink the dies $G^2$ so that the mark applied to the bobbin may be in ink of a suitable color, and for this purpose an inking mechanism is provided.

The inking mechanism is shown enlarged in Figs. 4-6 of the drawing. It comprises an inking plate of the two-part revoluble type and an inking roller reciprocated across the inking plate to transfer the ink therefrom to the die.

A bracket K is located in suitable relation to the die-carrying rotary member G, and carries a stub-shaft $K'$ on which are concentrically journaled the inner circular part $K^2$ of the inking plate, the outer concentric annular part $K^3$ of the inking plate and the pawl carriers $K^4$, $K^5$. The part $K^2$ is rotated by the ratchet wheel $K^6$, and the part $K^3$ by the ratchet wheel $K^7$. These ratchet wheels have their teeth inclined in opposite directions. The pawl carrier $K^4$ carries the pawl $K^8$, coöperating with the ratchet $K^6$, and the pawl carrier $K^5$ carries the pawl $K^9$ coöperating with the ratchet $K^7$. A spring $K^{10}$ connects the pivots of the two pawls $K^8$ and $K^9$ and thus acts both to keep the pawls in engagement with their respective ratchets and also to draw the ends of the pawl carriers to which the pawls are attached together. The opposite ends of the pawl carriers are provided with studs $K^{11}$, $K^{12}$, normally held close together by the spring $K^{10}$.

The bracket K is grooved, as shown at $K^{21}$, to receive therein the longitudinally-reciprocating carriage $K^{22}$. This carriage has pivoted thereto at $K^{23}$ an inking roll carrying arm $K^{24}$, on which is mounted the inking roll $K^{25}$. The arm is also provided at its forward end with a cam-shaped projection $K^{26}$, adapted to coöperate with a cam lever $K^{27}$, pivoted to the forward end of the carriage $K^{22}$. Stop-pins $K^{28}$, $K^{29}$, are mounted near each end of the travel of the carriage $K^{22}$, on the bracket K. The carriage $K^{22}$ has pivoted thereto at $K^{30}$, a link $K^{31}$, which is pivoted at its other end to a lever $K^{32}$, fulcrumed at $K^{33}$, and connected at its opposite end by a link $K^{34}$, with the lever $G^{15}$. The link $K^{31}$ is provided with a depending arm $K^{35}$, having a V-shaped nose $K^{36}$, adapted to enter in its movement between the studs $K^{11}$ and $K^{12}$. A spring $K^{37}$ connects the link $K^{31}$ and the inking roll carrying arm $K^{24}$ and normally tends to elevate the forward end of the latter and consequently the inking roll. From this description of the parts it will be seen that upon the operation of the lever $G^{15}$ by the bobbin the link $K^{31}$ moves forwardly, the cam $K^{27}$ being in the position shown in Fig. 4, and the inking roll $K^{25}$ rides over and against the inking plate $K^2$, $K^3$, and during this movement the nose $K^{36}$ enters between the studs $K^{11}$ and $K^{12}$, thus moving the pawl carriers in opposite directions and with them the parts of the inking plate, so that the ink is evenly distributed over the inking roll. When the carriage $K^{22}$ reaches the end of this reciprocation a cam $K^{27}$ comes in contact with the stud $K^{28}$ turning the cam $K^{27}$ and allowing the inking roll carrying arm $K^{24}$ to be elevated by the spring $K^{37}$ so that upon the return movement of the carriage $K^{22}$ the inking roll rides over and applies the ink to the face of the die $G^2$, until the end of this reciprocation is reached when the cam $K^{27}$ comes in contact with the pin $K^{29}$ and the parts are again in the position shown in Fig. 4.

It is frequently desirable that more than one coat be given to the bobbin by the coating mechanism, and it is accordingly necessary that the endless carrier shall carry the bobbins a corresponding number of times through the coating mechanism. In such cases it is necessary that the marking mechanism shall be thrown out of operation after the first passage of the bobbins therethrough. For this purpose means are provided whereby the marking mechanism will automatically be thrown out of operation after one passage of the endless carrier with the bobbins carried thereon. In the construction illustrated herein as an embodiment of the invention this is secured by mounting the rotary platen member $G^3$ on a lever $G^{30}$, and by mounting the rotary die member and all the parts heretofore described in connection with its operation and inking, upon the lever plate $G^{31}$, and by providing means for swinging the lever $G^{30}$ and the lever plate $G^{31}$ apart upon the passage of the endless carrier therethrough.

The lever $G^{30}$ is fulcrumed at $G^{32}$ to an overhanging arm $C^{10}$ of the framework C, and carries at its forward end a pin $G^{33}$, riding in a cam groove $G^{34}$ formed in the star-wheel $G^{35}$, pivoted at $G^{36}$ to an overhanging arm $C^{10}$. The lever plate $G^{31}$ is fulcrumed at $G^{37}$ to the framework C, and carries at its forward end a stud $G^{38}$, riding in a cam groove $G^{39}$, in a similar star-wheel $G^{40}$, pivoted at $G^{41}$ to the framework C.

The star-wheels $G^{35}$ and $G^{40}$ are located in the path of the rear portion of the spindle E, which is at that point provided with a shoulder $E^4$, adapted to receive a roll $E^5$. In the construction illustrated each movement of one point of the star-wheels $G^{36}$ and $G^{40}$, either separates the lever $G^{30}$ and the lever plate $G^{31}$, or brings them into operative position. In such case two coats can be given to the bobbins for each marking thereof. The operative after supplying the spindles of the endless carrier with bobbins until as many have been placed thereon as it is desired to mark and coat, places one of the rolls $E^5$ on the spindle E carrying the last bobbin or on a succeeding spindle. Consequently after the bobbins carried by the endless carrier have passed through the marking mechanism with the parts in the position shown in Fig. 2 and have been marked, the roll $E^5$, which has been placed on the last spindle carrying a bobbin or on a succeeding one, will move the star-wheels one point, separating the rotary platen and the rotary die members of the marking mechanism, so that when the bobbins come through on the next rotation to receive the second coat from the coating mechanism the marking mechanism will be inactive. When, however, the bobbins have passed through the second time the roll will move the star-wheels another point, bringing the rotary platen and rotary die members of the marking mechanism into the operative position illustrated in Fig. 2.

The coating mechanism to which the bobbins are carried by the endless carrier after their passage through the marking mechanism, is illustrated in detail in the embodiment of the invention herein shown in Figs. 7 and 8. It comprises a tank for containing the varnish, shellac, or similar material, an agitator, a rotary brush, means for supplying the liquid to the brush, and a means for moving the brush out of the path of the spindles when an empty spindle comes along, so that none of the liquid will be applied to the empty spindle.

The tank for containing the varnish, shellac, or other material, is shown at $P$, as of general rectangular form, and mounted on a support $P^2$. The tank is located between the side walls of a frame $P^3$, which serves to support the various mechanisms connected with the coating mechanism. The frame $P^3$ has journaled therein a transverse shaft $P^4$, and suitable means, such as the sprocket chain $P^5$ and sprocket gear $P^6$, are provided for driving the shaft from a suitable source of power.

The shaft $P^4$ carries a grooved wheel $P^7$ adapted to drive a belt $P^8$, which in turn passes around a grooved pulley $P^9$, fast on the longitudinal shaft $P^{10}$, and drives the same. The shaft $P^{10}$ carries at its forward end a beveled gear $P^{11}$, intermeshing with a beveled gear $P^{12}$, mounted on the vertical shaft $P^{13}$, which passes up through the bottom of the tank $P$ and carries the agitator $P^{14}$. It will thus be seen that the agitator is constantly rotated by means connected with the shaft $P^4$.

A brush frame $P^{20}$ is fulcrumed in the frame $P^3$ at $P^{21}$. The brush frame carries the bearing blocks $P^{22}$, adjustable up and down thereon by means of the set-screws $P^{23}$, which extend through threaded projections $P^{24}$ and $P^{25}$ into the bearing blocks. These bearing blocks carry one a fixed pivot pin $P^{26}$, and the other a shaft $P^{27}$, provided at its outer end with a sprocket gear $P^{28}$. This pivot pin and shaft pass through side walls of the tank $P$, and a rotary brush $P^{29}$ of the general outline of the bobbins to be coated is mounted on the shaft and turns on the pivot-pin. The frame $P^3$ has mounted in a bearing $P^{30}$ another pivot pin $P^{31}$, extending through the wall of the tank, and is provided at its outer end with a sprocket wheel $P^{33}$. A feeding roll $P^{34}$ is secured to said shaft $P^{32}$ and rotates on the pivot pin $P^{31}$. The pivot pin $P^{31}$ can be withdrawn to release the roll $P^{34}$, by moving the pivot pin against the action of the spring $P^{35}$, by means of the handle $P^{36}$. The roll $P^{34}$ is rotated by a sprocket chain $P^{37}$, connecting the sprocket wheel $P^{33}$ with the sprocket wheel $P^{28}$, fast on the shaft $P^4$. The feed roll $P^{34}$ is the complemental in outline of the brush $P^{29}$. A suitable doctor blade $P^{39}$ is adjustably mounted by means of the screws $P^{40}$ on a blade carrier $P^{41}$, pivoted at $P^{42}$ to a portion of the frame $P^3$. The blade carrier has a projection $P^{43}$, and a set-screw $P^{44}$ passes therethrough into a projection $P^{45}$ from the frame $P^3$. By means of this construction the doctor blade can be adjusted to a nicety with respect to the feed-roll $P^{34}$ so that the exact amount desired of the liquid may be fed to the brush, and from the brush to the bobbin.

The brush $P^{29}$ is rotated by means of a sprocket chain $P^{50}$, connecting the sprocket wheel $P^{28}$ on the brush driving shaft with one member of a double sprocket wheel $P^{51}$, mounted coaxially with the pivot $P^{21}$ of the brush frame $P^{20}$. The other member of the double sprocket wheel $P^{51}$ is connected by a sprocket chain $P^{52}$ with a sprocket chain $P^{53}$, mounted on a stub shaft $P^{54}$, and connected to a gear $P^{55}$, which intermeshes with a gear $P^{56}$ on and driven by the shaft $P^4$, so that the shaft $P^4$ acts through the intermediate connections to rotate the brush $P^{29}$. Adjustable idler pulleys $P^{57}$ and $P^{58}$ for taking up the slack in the sprocket chains $P^{52}$ and $P^{50}$ respectively are provided, and are shown as mounted on arms $P^{59}$ and $P^{60}$ respectively, carried by and rotarily adjustable upon the shafts $P^{21}$ and $P^{27}$.

The brush frame $P^{20}$ is normally in elevated position with the brush in the path of the bobbins to be coated by means of a strong spiral spring $P^{61}$, attached at one end to a projection $P^{62}$ of the brush frame, and at the other end to the support $P^2$. If the operative fails to place a bobbin on the spindle of the endless carrier it is obvious that the spindle itself would be coated by the brush which is obviously undesirable. To prevent this means are provided for lowering the brush frame $P^{20}$ about its pivotal point $P^{21}$ so as to take the brush out of the path of the spindles of the endless carrier and out of contact with the feed roll whenever a spindle comes along without a bobbin. This is secured by a cam $P^{70}$, loosely mounted on the shaft $P^4$, which at the proper time is connected thereto and thereupon acts to depress the brush frame $P^{20}$ by coming into contact with the rearwardly extending projection $P^{71}$ thereof. The cam $P^{70}$ is provided with a hole, and the shaft $P^4$ has rigidly attached thereto a clutch member $P^{72}$, carrying a clutch pin $P^{73}$, pressed by a spring $P^{74}$, and adapted to slide into the hole in the cam $P^{70}$. When the bobbin comes along on the spindle of the endless carrier this pin is prevented thereby from sliding into the hole in the cam $P^{70}$, but when an empty spindle comes along there is nothing to prevent the pin from sliding in the hole and it accordingly does so, which results in the rotation of the cam and the depression of the brush frame. The clutch pin $P^{73}$ is controlled for this purpose by a bell-crank lever $P^{75}$, pivoted on an upright $P^{76}$, from the frame $P^3$. One arm $P^{77}$ of this bell crank lever carries a vertically adjustable feeder $P^{78}$, located in the path of the bobbin-carrying spindle of the endless carrier, and the other arm $P^{79}$ is provided with a beveled edge $P^{80}$, adapted to coöperate with the beveled head of the clutch pin $P^{73}$. A coiled spring $P^{81}$, attached at its upper end to the bell crank lever and at its lower end to the upright $P^{76}$, acts to hold the bell crank lever with the feeder $P^{78}$ in the path of the bobbin spindle, and with the arm $P^{79}$ out of the path of the clutch pin $P^{73}$, a hook $P^{82}$ fastened to the arm $P^{79}$ and catching over the pin $P^{83}$, projecting from the upright $P^{76}$, and to which the lower end of the spring $P^{81}$ is fastened, limits the movement of the bell crank lever. It will thus be seen that as the clutch pin $P^{73}$ is carried around by the shaft $P^4$ if the arm $P^{79}$ is not depressed into the path of its head by a bobbin of the spindle of the endless carrier, that the spring $P^{74}$ will slide the clutch pin into a hole in the cam $P^7$ connecting it with the shaft $P^4$ and causing it to depress the brush frame and thus take the brush out of the path of the endless carrier.

The driving rolls $E^2$ of the spindles already described are rotated to cause the rotation of the spindles while the coating is being applied thereto by the brush, and for this purpose there is shown an endless driven belt R, which contacts with the driving rolls $E^2$ as the spindles come into the vicinity of the brush. The endless belt R runs over a pulley $R^2$ on a shaft driven from the belt $R^3$, by a suitable source of power, and also runs over an idler pulley $R^4$ on the end of an arm $R^5$, journaled on the shaft carrying the pulley $R^2$, and the weight of the arm $R^5$, the pulley $R^4$ and the belt is sufficient when resting upon the driving rolls E to cause the rotation of the latter when the belt R is in motion.

After the bobbins have passed through the coating mechanism and the coating has been applied thereto they are then carried by the endless carrier over a long and preferably sinuous course, determined by the position of the idler rolls B, as indicated in Fig. 1. The length of the course thus traveled by the bobbins is such that the coating will be thoroughly dried when they reach the end of their course. The invention then provides a mechanism for ejecting the bobbins from the carrier, which may be brought into action immediately or which may allow the bobbins to make a plurality of traverses before being brought into action. This ejector mechanism is shown in detail in Figs. 9 and 10 of the drawing.

The ejector mechanism comprises a movable stripper, means for moving the stripper, and a controller operated from the carrier to determine the movement of the stripper into and out of operative position.

In the embodiment of the invention illustrated the endless carrier comes down on a vertical stretch to the idler roll B shown in Figs. 9 and 10, and is guided in this vertical path by guide-plates $S^2$, $S^3$, which coming lightly into contact with the rolls $A^7$ and the driving rolls $E^2$ respectively direct the spindles along a definite vertical line. These plates are shown bolted respectively at $S^4$, $S^5$, on to the framework C.

The stripper S is shown as a box-like structure formed of sheet metal, having an inclined bottom $S^6$ longitudinally slotted at $S^7$, and it is pivoted at $S^8$ to a base-plate $S^{10}$ mounted on the framework C, so that the upper end may be swung toward and from the guides $S^2$, $S^3$. The slot $S^7$ is so arranged as to lie in the same plane as that into which the spindles on the endless carrier are guided by the guides $S^2$, $S^3$. When the upper end of the stripper S is in operative position the spindles as they come down on the endless carrier will pass into the slot $S^7$ with the bobbins carried thereon passing down the inclined bottom $S^6$ of the stripper, and thus being removed thereby from the spindles.

The exact operative position of the stripper S is determined by a set-screw $S^9$, adjustably mounted in the base of the stripper and contacting with the base-plate $S^{10}$. The stripper is swung backward and forward about its pivot $S^8$ into and out of operative position by means of the link $S^{20}$, pivoted at one end at $S^{22}$ to the stripper, and at the other end at $S^{23}$ eccentrically to a gear $S^{24}$, mounted on a stub-shaft $S^{25}$.

The gear $S^{24}$ is driven by a pinion $S^{26}$, which in the construction herein shown makes two revolutions to one revolution of the gear. The pinion $S^{26}$ is fast on a shaft $S^{27}$, arranged parallel to the shaft $S^{25}$. The shaft $S^{27}$ has in the construction shown loosely mounted thereon a beveled gear $S^{28}$, intermeshing with a beveled gear $S^{29}$, carried by a shaft $S^{30}$, mounted transversely to the shafts $S^{25}$ and $S^{27}$, and driven in any suitable way from a suitable source of power, as by the sprocket wheels $S^{31}$, $S^{32}$ and sprocket chain $S^{33}$, illustrated.

The beveled gear $S^{28}$ has fast thereto a clutch disk $S^{30}$, provided with a hole in its face. The shaft $S^{27}$ has fast thereon a clutch block $S^{31}$, carrying a clutch pin $S^{32}$ adapted to slide into the hole in the clutch plate $S^{30}$, and lock the clutch block $S^{31}$ and accordingly the shaft $S^{27}$ thereto. The clutch pin $S^{32}$ is headed at $S^{33}$ and a coiled spring $S^{34}$ acts normally to maintain the clutch pin disconnected from the clutch plate $S^{30}$. A disk $S^{35}$ surrounds the shaft $S^{27}$ and is rigidly mounted on the bearing $S^{36}$ for the shaft $S^{27}$. The disk $S^{35}$ is provided with a hole alining with and adapted to receive the head $S^{33}$ of the clutch pin. A controller lever $S^{40}$ is pivoted at $S^{42}$ to the framework and provided on one arm with an adjustable striker plate $S^{43}$, projecting into the path of the shoulders $E^4$ of the spindles on the endless carrier, and provided on its other arm with a projection $S^{44}$, adapted to swing into the hole in the disk $S^{35}$ and contact with the head $S^{33}$ of the clutch pin.

The operation of the ejector mechanism will now be apparent. When the machine is arranged as already described to apply two coats of the coating material to the bobbins one of the rolls $E^5$ is placed on the spindle containing the last bobbin or upon the succeeding spindle, and when the bobbins are about upon the carrier preparatory to marking and coating the parts of the ejector mechanism will be in the opposite position to that shown in Figs. 9 and 10, that is, with the stripper swung forward and with the pivotal connection $S^{23}$ of the link $S^{20}$ in its diametrically opposite position. After the bobbins have passed through the marking and coating mechanism they will travel down the guideway formed by the guides $S^2$, $S^3$, but will not be caught by the stripper. When the roll $E^5$ comes along it will, acting against the striker plate $S^{43}$, depress the controller lever $S^{40}$, thus pressing inwardly the clutch pin $S^{32}$, until it enters the hole in the revolving clutch plate $S^{30}$, when its head $S^{33}$ will be withdrawn from the disk $S^{35}$. The shaft $S^{27}$ will at once be locked to the gear $S^{28}$, and will be given one revolution until the clutch pin again comes opposite the hole in the disk $S^{35}$ when it will spring back into the position shown in Fig. 9, unlocking the shaft $S^{27}$ from bevel gear $S^{28}$. This revolution of the shaft $S^{27}$ will cause one half revolution to the gear $S^{24}$, and consequently move the link $S^{20}$ and the stripper S into the position shown in Fig. 10, so that as the bobbins again come around on the second trip they will ride over the stripper, down the inclined bottom $S^6$, and be ejected from the endless carrier. The stripper is shown as provided with a projecting flange $S^{50}$, the edge $S^{51}$ of which will contact with the shoulder $E^4$ on the spindles and thus hold the carrier steady while the bobbins are stripped therefrom. When the roll $E^5$ at the end of the bobbins on the carrier comes into position it will again operate the controller lever $S^{40}$ to cause another revolution to the shaft $S^{27}$ and thus bring the stripper S again into its inoperative position.

In the drawings the apparatus has been shown as arranged to give two coatings to the bobbin, but it will be seen that any other plurality of coatings may be given and the bobbins ejected thereafter by simply changing the relation of the cam grooves and points of the star wheels $G^{35}$ and $G^{40}$, and the relation of the gear $S^{24}$ and pinion $S^{26}$.

Having described my invention, what I claim as new and desire to secure by Letters Patent, is:

1. A machine of the class described, comprising a flexible endless carrier, a series of holders thereon presenting a spindle projecting therefrom and adapted to support detachably a bobbin, a coating mechanism located in the path of travel of said holders, a bobbin ejecting mechanism located in the path of travel of said holders, a striker removably mounted on a selected holder and acting to throw into and out of operation as desired said bobbin ejecting means.

2. A machine of the class described, comprising a flexible endless carrier, a series of holders thereon presenting a spindle projecting therefrom and adapted to support detachably a bobbin, a printing mechanism, a coating applying mechanism, and a bobbin ejecting mechanism, each located in the path of travel of said holders, a striker removably mounted on a selected holder and acting to throw into and out of operation as desired said printing and said bobbin ejecting mechanisms.

3. A machine of the class described, comprising a flexible endless carrier, a series of holders thereon presenting a spindle projecting therefrom and adapted to support detachably a bobbin, a printing mechanism, a coating applying mechanism, and a bobbin ejecting mechanism, each located in the path of travel of said holders, a striker removably mounted on a selected holder and acting to throw into and out of operation as desired said printing and said bobbin ejecting mechanisms, and means actuated by or through a bare spindle to render inoperative said coating mechanism until after the passage of said bare spindle.

4. A machine of the class described, comprising a flexible endless carrier, a series of holders thereon presenting a spindle projecting therefrom and adapted to support detachably a bobbin, a printing mechanism and a coating mechanism, located in the path of travel of said holders, a trackway extending past said printing and coating mechanisms, guide-rolls carried at intervals by said carrier and adapted to run on said trackway and thus secure the proper presentation of said bobbins to said mechanisms.

5. A machine of the class described, comprising a flexible endless carrier, a series of holders thereon presenting a spindle projecting therefrom and adapted to support detachably a bobbin, a printing mechanism and a coating mechanism, located in the path of travel of said holders, a trackway extending past said printing and coating mechanisms, guide-rolls carried at intervals by said carrier and adapted to run on said trackway and thus secure the proper presentation of said bobbins to said mechanisms, an alining device adjacent the entrance to the printing mechanism adapted to aline the bobbins mounted upon the carrier as they are presented to the printing mechanism.

6. A machine of the class described, comprising a flexible endless carrier, a series of holders thereon presenting a spindle projecting therefrom and adapted to support detachably a bobbin, a printing mechanism, a coating applying mechanism, and a bobbin ejecting mechanism each located in the path of travel of said holders, a striker removably mounted on one of said holders and acting upon a predetermined number of passages through said printing and bobbin ejecting mechanisms to throw the same into or out of operation, whereby the bobbins may be caused to pass through said printing mechanism a predetermined number of times without being printed upon but once and may pass through the ejecting mechanism without being ejected thereby until desired.

7. A machine of the class described, comprising a flexible endless carrier, a series of holders thereon presenting a spindle projecting therefrom and adapted to support detachably a bobbin, a coating mechanism and a printing mechanism located in the path of travel of said holders, a striker removably mounted on a selected holder, and means actuated by said striker to throw out of operation said printing mechanism after a predetermined number of passages of said striker past said printing mechanism, whereby the bobbins may be acted upon by the printing mechanism a less number of times than by the coating mechanism.

8. A machine of the class described, comprising a flexible endless carrier, a series of holders thereon presenting a spindle projecting therefrom and adapted to support detachably a bobbin, a coating mechanism and a printing mechanism located in the path of travel of said holders said printing mechanism comprising a die member and a platen member, a striker removably mounted on a selected holder, means actuated by said striker to separate said die and platen members after a predetermined number of passages of said striker past said printing mechanism whereby the bobbins may be acted upon by the printing mechanism a less number of times than by the coating mechanism.

9. A machine of the class described, comprising a flexible endless carrier, a series of holders thereon presenting a spindle projecting therefrom and adapted to support detachably a bobbin, a coating mechanism and a printing mechanism each located in the path of travel of said holders said printing mechanism comprising a revoluble die member and a platen member, a lever projecting into the path of the bobbins carried by the spindle connections between said lever and said die member to rotate said die member to present a freshly inked die to each bobbin upon the actuation of the lever.

10. A machine of the class described, comprising a flexible endless carrier, a series of holders thereon presenting a spindle projecting therefrom and adapted to support detachably a bobbin, a coating mechanism and a printing mechanism each located in the path of travel of said holders, said printing mechanism comprising a revoluble die member and a platen member, an inking mechanism, a lever projecting into the path of the bobbin carried upon the spindle, connections from said lever to the inking mechanism to operate the inking mechanism to ink a die and connections from said lever to the die member to rotate the die member to bring a freshly inked die into the path of each bobbin.

11. A machine of the class described, comprising a flexible endless carrier, a series of holders thereon presenting a spindle projecting therefrom and adapted to support detachably a bobbin, a coating applying mechanism located in the path of travel of said holders, comprising a vat to contain the coating material, a rotary brush, a roll mounted in the vat for transferring the coating to the brush, means for driving said brush and roll, means actuated by or through a bare spindle to lower the brush out of the path of the spindle until after its passage.

12. A machine of the class described, comprising a flexible endless carrier, a series of holders thereon presenting a spindle projecting therefrom and adapted to support detachably a bobbin, a movable slotted stripper adapted when in the path of the bobbins to receive the spindle in said slot and strip the bobbins from the carrier, a striker removably mounted on a selected holder, means actuated upon a predetermined number of passages of said striker there past to move the stripper into operative position for stripping the bobbins from the carrier.

13. A machine of the class described, comprising a flexible endless carrier, a series of holders thereon presenting a spindle projecting therefrom and adapted to support detachably a bobbin, means for guiding the carrier in a defined path, a slotted stripper pivotally mounted to present when in operative position its slot in the path of the spindles so that the bobbins may be stripped therefrom upon the passage of the spindles down said slot, a striker removably mounted on a selected holder, means actuated by said striker for swinging the stripper into and out of operative position as desired.

14. A machine of the class described, comprising a flexible endless carrier, a series of holders thereon presenting a spindle projecting therefrom and adapted to support detachably a bobbin, a coating applying mechanism located in the path of travel of said holders, comprising a vat to contain the coating material, a rotary brush, a roll mounted in the vat for transferring the coating to the brush, means for driving said brush and roll, means actuated by or through a bare spindle to lower the brush out of the path of the spindle and out of contact with the feed roll until after its passage.

In testimony whereof I have signed my name to this specification, in the presence of two subscribing witnesses.

FRED C. HODGMAN.

Witnesses:
CARL H. FRENCH,
EDWARD DANA OSGOOD.